Patented June 17, 1952

2,601,109

UNITED STATES PATENT OFFICE 2,601,109

METHOD OF PREPARING BLENDS OF HYDROCARBON POLYMERS AND PETROLEUM WAXES

John J. Fish, New York, N. Y., assignor to Sun Chemical Corporation, New York, N. Y., a corporation of Delaware No Drawing. Application April 17, 1948, Serial No. 21,751

5 Claims. (Cl. 260—28.5)

1

This invention relates to wax-like compositions containing polymerized hydrocarbon materials and more particularly to a method of preparing such compositions.

One object of the present invention is to provide stable, homogeneous wax-like compositions containing polymerized hydrocarbon materials which compositions exhibit no separation in the molten state on standing nor upon cooling.

Another object of the present invention is to provide stable, homogeneous wax-like compositions containing polymerized hydrocarbon materials which compositions are characterized by the property of forming tough, flexible, non-tacky and highly water resistant coatings.

Other objects of the present invention will be apparent from the description and appended claims.

One of the important commercial applications of paraffin waxes is the use of such materials as moisture-proof coatings for paper and similar materials utilized in the wrapping, packaging and cold storing of food products to preserve the moisture content contained therein, and in the packaging of certain commodities wherein the entrance of moisture thereto, or the loss of the moisture content therefrom, would have a deteriorating effect upon the particular article so affected. However, the utilization of such materials as moisture resistant coatings leaves much to be desired especially under certain conditions of temperature and storage. Because of the relatively low softening point of the paraffin waxes, the waxcoats have a tendency to become soft at the higher temperatures encountered in various climates and during certain periods of the year, said softening action resulting in an appreciable decrease in the moisture resistance of such coatings. Furthermore, when such wax coated materials are utilized in packaging means such as cartons, containers or wrapping paper and arranged for shipment or storage in the manner generally employed in such operations and under such conditions of higher temperatures as are mentioned above, "blocking" of the waxcoat may occur upon separation or rearrangement of the said packages. That is, the softening of the wax material may cause the waxcoats to become fused and to adhere to each other at the point of contact between the packages, and may cause the protective wax film to be torn from the surfaces of the coated material upon separation, thus breaking the film and allowing the penetration of moisture therein. A further disadvantage of such wax coated materials is the inability of the coatings to withstand wrinkling or creasing without decreasing the moisture resistant property of the coated material. Moreover such wax coatings are fairly soft permitting the protective film to be easily broken or scraped off upon handling, or during wrapping or packaging operations.

The disadvantages in use of such wax coatings have impelled waxcoat manufacturers to seek a material which might be employed in conjunction with paraffin to provide moisture resistant coatings which would remedy such undesirable characteristics of paraffin coatings as are set forth above and which would not be prohibitive economically. To be effective for such an application, it is necessary that such a material have a relatively high softening point and be highly moisture resistant, and furthermore that it have the ability when utilized in combination with paraffin waxes to impart such properties to the said combination. It is further imperative that such a material be non-toxic and that it contain no impurities which might impart odor, color or taste to such products which may be packaged therewith. It is also essential that such a material be compatible with paraffin waxes to the extent of forming homogeneous mixtures with the said waxes which do not separate in the molten state on standing, nor upon cooling, and which may be applied as a uniform, continuous film upon paper or similar sheeting in the manner and by the methods commercially utilized in such operations. The films thus formed should be tough, non-tacky, and flexible and have the ability to resist the passage of moisture therethrough upon creasing or wrinkling of such coated material.

One such material which would seem to possess all of the qualities necessary to achieve the desirable characteristics enumerated above is polyethylene. Polyethylene is a highly polymerized, thermoplastic resinous material; the polymerization product of ethylene subjected to conditions of high temperatures and high pressures. It is odorless, tasteless, and non-toxic, translucent white in color and resembling paraffin wax in appearance and texture. It is a tough, inherently flexible material, capable of forming strong, flexible films which are characterized by the high resistance of such films to wetting or penetration by moisture. Another desirable property of polyethylene is its relatively high softening point, softening in the temperature range of 108–112° C. depending upon the molecular weight of the particular polymer. These temperatures are greatly in excess of even the highest atmospheric temperatures and generally of any to be encountered under ordinary conditions of shipment or storage of packaged commodities.

However a further characteristic of polyethylene is the resistance of this material toward solution in all the common organic solvents at low temperatures and particularly its immiscibility with paraffinic hydrocarbons, waxes and mineral oils, below the melting point of polyethylene. For these reasons, as far as I have been able to learn from a study of the literature, stable solutions of polyethylene in paraffin, or in other wax materials, which upon application as a film would not separate on cooling, have hitherto not been prepared with any degree of success. When seemingly miscible admixtures of polyethylene and paraffin in the molten state are applied as films upon paper or similar materials, the polyethylene upon cooling solidifies prior to the paraffin and has a tendency to squeeze the paraffin out of the film. Rapid chilling of such admixtures or of the applied coating apparently prevents such separation at the time of cooling. However higher temperatures during a storage period usually softens the paraffin sufficiently to induce a separation from the polyethylene thereby decreasing the moisture resistance of the coating.

I have found that by subjecting mixtures of polyethylene and a non-volatile, aliphatic hydrocarbon material to treatment under agitation conditions with a metallic halide, at temperatures above approximately 200° F. but below the temperature at which cracking of the said hydrocarbon material occurs, stable, homogeneous wax-like compositions are formed which exhibit no separation in the molten state on standing, nor upon cooling, and are characterized by the property of forming tough, flexible, non-tacky and highly water resistant coatings.

The compositions of the present invention are not an ordinary melting together of two substances, nor colloidal suspensions of ane substance in another. This is proven by the fact that the polyethylene begins to enter into solution with the particular hydrocarbon material employed at temperatures below the melting point of polyethylene. Furthermore when polyethylene is heated to its melting point, it becomes soft, viscous, and stringy, whereas in the method employed for preparing the compositions of the present invention the polyethylene appears to dissolve in the lower melting paraffin without any appearance of stringiness. Further proof that the materials utilized in preparing the compositions of the present invention have formed a solution with each other is the fact that these compositions may be dissolved in naphtha or similar suitable solvents without precipitation or separation of the ordinarily insoluble polyethylene upon cooling of such solutions. Such results are not obtained when polyethylene and paraffin are merely melted together.

The hydrocarbon materials utilized in combination with polyethylene in preparing the compositions of the present invention are preferably paraffin waxes, micro-crystalline wax materials obtained by the fractional distillation and/or solvent extraction of wax containing petroleums or petroleum storage residues, and the solid or highly viscous petrolatums. Such stable and homogeneous compositions may also be obtained by utilizing mineral oils and the less viscous or liquid petrolatums but such compositions are not preferred as film forming and coating compounds because of the large percentage of polyethylene required to give such compositions the required consistency and toughness for such applications. Other non-volatile aliphatic hydrocarbon materials such as those resulting from the reaction of carbon monoxide and hydrogen according to the well known Fischer-Tropsch synthesis may also be utilized in carrying out my invention.

One method which may satisfactorily be employed in the commercial preparation of the compositions of the present invention is set forth in the following illustrative procedure.

A weighed amount of a hydrocarbon material selected from the group described hereinbefore is charged to a vessel equipped with means for heating said vessel and with suitable means for agitation of material contained therein, and heating is begun. The heating means may be any of the kind ordinarily employed in such operations to achieve the temperatures required in the process of the present invention, such as steam passed through a jacket which is a part of the reaction vessel. When the material in the reaction vessel has attained a temperature of approximately 260–270° F. agitation is started, and approximately 0.1 per cent aluminum chloride based upon the weight of the hydrocarbon material contained in the vessel is added thereto. The desired percentage of polyethylene is now introduced into the molten hydrocarbon material, the addition of the polyethylene causing a reduction in the temperature of the melt, the degree of such temperature reduction being dependent upon the percentage of polyethylene employed. For example, it has been found that the addition of polyethylene in an amount equal to 20 per cent by weight based upon the combined weight of the said materials utilized generally reduces the temperature of the melt to approximately 220° F. The polyethylene immediately starts into solution, and by maintaining slow heating such solution is ordinarily complete at approximately 240° F. with the ratio of materials set forth above. At this point heating is discontinued and the temperature of the solution is allowed to rise to approximately 260° F., the rise in temperature after termination of heating being a normal occurrence in the process of the present invention. A completely uniform solution which shows no separation on standing, nor upon cooling, and which solidifies smoothly is obtained. The product which is derived from the procedure as outlined above is characterized by the property of forming tough, flexible, non-tacky and highly water resistant coatings.

Those products of the present invention which contain a relatively low percentage of polyethylene exhibit a fairly low viscosity in the molten state. However, as the percentage of polyethylene is increased, more highly viscous melts are formed which require strong mechanical agitation to achieve the desired results of the present invention. Therefor the maximum percentage of polyethylene which may be employed to form stable, homogeneous solutions with the hydrocarbon materials mentioned above is dependent solely upon the available mixing equipment. I have satisfactorily prepared such solutions containing up to 30 percent polyethylene based upon the combined weight of the materials utilized, employing propeller type mixing devices as are commercially available. Higher percentages of polyethylene may be incorporated by the utilization of strong, kneader type mixers.

The particular hydrocarbon material which is utilized in combination with polyethylene to form the products of the present invention may exhibit a slight discoloration in the molten state after the addition thereto of the aluminum chloride. This undesirable feature may be carried over into the finished product unless it is eliminated before the reaction has been completed. I have found that such discoloration may be eliminated at any time during the course of the procedure as outlined above by vigorous agitation of the molten material. Another means by which such discoloration of the melt may be eliminated is by the introduction into the said melt of an oxygen-containing gas in a manner and by such means as is described in my patent application Serial No. 21,752 filed on even date herewith, now abandoned.

The amount of aluminum chloride required to produce the wax-like compositions exhibiting the desirable characteristics of the present invention is dependent upon the percentage of polyethylene desired in the finished products. However, a percentage of aluminum chloride between about 0.05 and about 1.0 per cent by weight, the said percentage by weight being based upon the weight of the particular hydrocarbon material being used in conjunction with the polyethylene, has been found to be satisfactory for carrying out the present invention. It is preferable to utilize the minimum amount of aluminum chloride necessary to obtain the desirable products of the present invention to avoid the formation of an excess of hydrogen chloride which should be eliminated from the melt before the solution is allowed to solidify.

Other metallic halides may be employed in place of the aluminum chloride in carrying out the present invention. For example, iron chloride, both the ferrous and ferric salts, zinc chloride, boron trifluoride and similar halogen salts of the metals may be substituted for aluminum chloride in the procedure outlined above to yield wax-like compositions having the characteristics of the present invention. However, the used of such other metallic halides will be governed by the extent of discoloration which such salts impart to the finished product, and also by the amount and type of gases which are formed during the process.

By subjecting the products obtained according to the above illustrative procedure to the several tests set forth above in the specification for such determination, such as the solubility of the said products in a suitable solvent without precipitation or separation of the polyethylene, and the ability of the compositions of the present invention to withstand separation of the materials contained therein both in the molten state on standing and upon cooling, it will be found that the said products are not simple melts of the materials utilized nor mere colloidal suspensions of such materials. This is further shown by the fact that the specific gravity of the products of the present invention are not merely composites of the specific gravities of the materials utilized but are completely new and characteristic of the said products. The products of the present invention also exhibit a much higher tensile strength and a far lower viscosity in the molten state than do equivalent mixtures, or colloidal suspensions, of the corresponding materials.

The reason why such stable and homogeneous compositions of materials ordinarily immiscible are formed by the methods as set forth above, is not known with any degree of certainty. It is known from a determination of the acid and saponification numbers that oxidation of the materials so treated does not occur. It may be that the aluminum chloride forms a reaction product with the particular hydrocarbon material utilized which in turn possibly forms an addition compound with the polyethylene. Whatever the case may be, by treating mixtures of polyethylene and such non-volatile, aliphatic hydrocarbon materials as are mentioned hereinbefore with a metallic halide at the temperatures set forth in the specification, there are formed stable, homogeneous wax-like compositions having the desirable characteristics of the present invention.

The products of the present invention are stable, homogeneous compositions which do not separate in the molten state on standing nor upon cooling and are characterized by the property of forming tough, glossy, non-tacky and highly water resistant coatings. These products also exhibit a high tensile strength and a relatively high softening point as compared to the softening point of the specific hydrocarbon material utilized in conjunction with polyethylene to form the desirable compositions of the present invention. These compositions may be employed in all the standard procedures and operations commercially utilized for applying wax coats to paper, and when so used do not produce any distortion of the paper and have the effect of greatly strengthening the paper and rendering it highly moisture resistant. The compositions of the present invention are non-toxic, odorless and tasteless and are sufficiently clear to be applied over printed matter. Due to this clarity and lightness of color, the wax compositions of the present invention are well adapted to the incorporation of colored pigments, thus lending themselves to a variety of decorative as well as moisture resistant applications.

A further characteristic of these compositions is the fact that such compositions containing a high percentage of polyethylene may be diluted in the molten state with an additional amount of the corresponding hydrocarbon material as that utilized in the said composition without impairing the desirable qualities of the products of the present invention; the admixture thus formed attaining the same characteristics as are had in the products of the present invention. For example, a composition consisting of 70% paraffin and 30% polyethylene may be diluted with an additional amount of paraffin to form a stable, homogeneous composition consisting of 97% paraffin and 3% polyethylene the composition thus formed exhibiting the same desirable characteristics of the present invention as regards its moisture resistance and its film forming and coating properties.

While I prefer to utilize polyethylene in preparing the products of the present invention, other polymerized hydrocarbon materials may be substituted for polyethylene in the procedure as outlined above to yield wax-like compositions having the desirable characteristics of the present invention and which are suitable for use in such applications as hereinbefore set forth. Such other materials which may be employed in conjunction with paraffin or with such other non-volatile aliphatic hydrocarbon materials as are mentioned hereinbefore to form the products of the present invention, are polystyrene, and, generally, the polymers of the unsaturated hydrocarbons, such as polypropylene and polyisobutylene. The wax-like compositions resulting from the utilization of these materials in accordance with the present invention show no separation in the molten state upon standing, nor upon cooling, and are characterized by the property of forming tough, flexible, non-tacky and highly water resistant coatings. As in the case of the wax-like compositions of the present invention containing polyethylene, those products, resulting from the utilization of such other polymerized hydrocarbon materials in place of polyethylene as are mentioned above, and which contain relatively high percentages of the said polymerized hydrocarbon materials, may be diluted in the molten state with a sufficient amount of the corresponding non-volatile aliphatic hydrocarbon material as that contained in the said products to form wax-like compositions of greatly reduced viscosities, suitable for application as wax coats by the methods commercially employed for such application while still retaining the desirable properties and characteristics of the products of the present invention.

While the products described herein and methods of making same constitute preferred embodiments of the present invention, changes may be made therein without departing from the scope of the present invention as defined in the appended claims.

What is claimed is:

1. A process of preparing stable, homogeneous wax-like compositions which show no separation in the molten state when standing, nor upon cooling, and which are characterized by the property of forming tough, flexible, non-tacky and highly water resistant coatings, which consists of subjecting a polymerized mono olefin and a petroleum wax material consisting of saturated hydrocarbons to treatment with a metallic halide selected from the group consisting of boron trifluoride and the halides of aluminum, iron, and zinc, at temperatures above 200° F. but below the temperature at which cracking of the said petroleum wax material occurs.

2. A process of preparing stable, homogeneous wax-like compositions which show no separation in the molten state on standing, nor upon cooling, and which are characterized by the property of forming tough, flexible, non-tacky and highly water resistant coatings, which consists of subjecting polyethylene and a petroleum wax material consisting of saturated hydrocarbons to treatment with a metallic halide selected from the group consisting of boron trifluoride, and the halides of aluminum, iron, and zinc, at temperatures above 200° F. but below the temperature at which cracking of the said petroleum wax material occurs.

3. A process of preparing stable, homogeneous wax-like compositions which show no separation in the molten state on standing, nor upon cooling, and which are characterized by the property of forming tough, flexible, non-tacky and highly water resistant coatings, which consists of subjecting polyethylene and paraffin to treatment with a metallic halide selected from the group consisting of boron trifluoride, and the halides of aluminum, iron, and zinc at temperatures above 200° F. but below the temperature at which cracking of the paraffin occurs.

4. A process of preparing stable, homogeneous wax-like compositions which show no separation in the molten state on standing, nor upon cooling, and which are characterized by the property of forming tough, flexible, non-tacky and highly water resistant coatings, which consists of subjecting polyethylene and a microcrystalline hydrocarbon wax material to treatment with a metallic halide selected from the group consisting of boron trifluoride, and the halides of aluminum, iron, and zinc at temperatures above 200° F. but below the temperature at which cracking of the said microcrystalline hydrocarbon wax material occurs.

5. A process of preparing stable, homogeneous wax-like compositions which show no separation in the molten state on standing, nor upon cooling, and which are characterized by the property of forming tough, flexible non-tacky and highly water resistant coatings, which consists of subjecting polyethylene and petrolatum to treatment with a metallic halide selected from the group consisting of boron trifluoride, and halides of aluminum, iron, and zinc, at temperatures above 200° F. but below the temperature at which cracking of the petrolatum occurs.

JOHN J. FISH.

REFERENCES CITED

The following references are of record in the file of this patent:

UNITED STATES PATENTS

| Number | Name | Date |
|---|---|---|
| 2,106,232 | Zorn et al. | Jan. 25, 1938 |
| 2,142,220 | Steffen et al. | Jan. 3, 1939 |
| 2,282,456 | Christmann et al. | May 12, 1942 |
| 2,339,958 | Sparks | Jan. 25, 1944 |
| 2,448,799 | Happoldt et al. | Sept. 7, 1948 |
| 2,504,270 | MacLaren et al. | Apr. 18, 1950 |
| 2,523,705 | Lovell et al. | Sept. 26, 1950 |

OTHER REFERENCES

Calloway Chemical Reviews, vol. 17, 1935, page 375.